United States Patent
Roskind

(10) Patent No.: US 7,954,146 B2
(45) Date of Patent: *May 31, 2011

(54) IMPLICIT POPULATION OF ACCESS CONTROL LISTS

(75) Inventor: James A. Roskind, Redwood City, CA (US)

(73) Assignee: AOL Inc., Dulles, VA (US)

( * ) Notice: Subject to any disclaimer, the term of this patent is extended or adjusted under 35 U.S.C. 154(b) by 47 days.

This patent is subject to a terminal disclaimer.

(21) Appl. No.: 12/349,161

(22) Filed: Jan. 6, 2009

(65) Prior Publication Data

US 2009/0199271 A1  Aug. 6, 2009

Related U.S. Application Data

(63) Continuation of application No. 11/782,461, filed on Jul. 24, 2007, now Pat. No. 7,490,238, which is a continuation of application No. 10/334,142, filed on Dec. 31, 2002, now Pat. No. 7,263,614.

(51) Int. Cl.
*G06F 17/00* (2006.01)
*H04L 9/32* (2006.01)
*H04L 12/28* (2006.01)

(52) U.S. Cl. ........... 726/15; 713/168; 713/170; 370/351

(58) Field of Classification Search .................. None
See application file for complete search history.

(56) References Cited

U.S. PATENT DOCUMENTS

| | | |
|---|---|---|
| 5,793,365 A | 8/1998 | Tang et al. |
| 5,870,744 A | 2/1999 | Sprague |
| 5,960,173 A | 9/1999 | Tang et al. |
| 6,269,369 B1 | 7/2001 | Robertson |
| 6,349,327 B1 | 2/2002 | Tang et al. |
| 6,366,962 B1 * | 4/2002 | Teibel ........................ 709/245 |
| 6,389,127 B1 | 5/2002 | Vardi et al. |
| 6,415,318 B1 | 7/2002 | Aggarwal et al. |
| 6,449,344 B1 | 9/2002 | Goldfinger et al. |
| 6,564,261 B1 | 5/2003 | Gudjonsson et al. |
| 6,816,578 B1 * | 11/2004 | Kredo et al. ............... 379/88.17 |
| 6,990,513 B2 * | 1/2006 | Belfiore et al. ............. 709/203 |
| 6,993,327 B2 * | 1/2006 | Mathis ...................... 455/414.1 |
| 7,263,614 B2 | 8/2007 | Roskind |
| 7,283,805 B2 * | 10/2007 | Agrawal ................... 455/412.2 |
| 7,316,028 B2 * | 1/2008 | Donatelli et al. ............. 726/11 |

(Continued)

OTHER PUBLICATIONS

AOL (R) Instant Messenger (TM), available on Nov. 21, 2002, reprinted from http://web.archive.org/web/20021121031257/http://aim.com on Aug. 31, 2005 (2 pages).

International Search Report from International Application No. PCT/US03/41499, dated Oct. 27, 2004.

"File Transfer Preferences", AOL Instant Messenger, version 5.1, Help Documentation, apparently available as of Nov. 21, 2002, 2 pages.

(Continued)

*Primary Examiner* — Kambiz Zand
*Assistant Examiner* — William S Powers
(74) *Attorney, Agent, or Firm* — Finnegan, Henderson, Farabow, Garrett & Dunner, LLP

(57) ABSTRACT

Communication applications may include lists of users with which a user of the application communicates. If two users of a communications application each include the other user on their user lists, an implicit trust may be established between the users. For example, if user A includes user B in her list and user B includes user A in his list, then it may be determined that each user knows and/or trusts the other user. As a result, a connection or communications pathway may be automatically created between the client devices of the users to facilitate communications between the users based on the implicit trust.

24 Claims, 6 Drawing Sheets

U.S. PATENT DOCUMENTS

| | | | |
|---|---|---|---|
| 2002/0055975 A1* | 5/2002 | Petrovykh | 709/205 |
| 2002/0083136 A1* | 6/2002 | Whitten, II | 709/205 |
| 2002/0086732 A1* | 7/2002 | Kirmse et al. | 463/42 |
| 2003/0233416 A1* | 12/2003 | Beyda | 709/206 |
| 2007/0271607 A1 | 11/2007 | Roskind | |

OTHER PUBLICATIONS

Hudson, Greg; Security in the Internet Message and Presence Protocols, internet-draft for IMPP Security, Nov. 21, 2000.

* cited by examiner

IMPLICIT POPULATION OF ACCESS CONTROL LISTS

CROSS-REFERENCE TO RELATED APPLICATIONS

This application is a continuation application of and claims priority to U.S. application Ser. No. 11/782,461, now U.S. Pat. No. 7,490,238, filed Jul. 24, 2007, which is a continuation of U.S. application Ser. No. 10/334,142, now U.S. Pat. No. 7,263,614, filed on Dec. 31, 2002, the entire contents all of which are hereby incorporated by reference.

TECHNICAL FIELD

The following description relates to network communications.

BACKGROUND

With the rapid proliferation and affordability of computers, the Internet has become the communications medium of choice for many users. Although the Internet is a public medium, techniques have been developed for using the Internet to enable private communications between networks. One such private communications technique is used to enable instant messaging.

Instant messaging allows users to rapidly communicate with other users of a communications network. Generally, client messaging software runs on a client A device 102 and provides a communications interface for entry of a message. The intended message recipient may be entered manually or may be selected from a user list, such as a Buddy List™ from America Online, Inc. Instant messaging may be used to communicate text messages, images, and sounds or voice.

SUMMARY

In one general aspect, messaging applications, systems, and methods may be used to automatically configure a communications pathway based on an implicit trust between users. Each user of a communications application may have a user list that identifies other users to which a message may be sent. If two users of the communications application each include the other user on their user lists, an implicit trust may be inferred between the users. For example, if user A includes user B in her user list and user B includes user A in his. user list, then it may be inferred or determined that each user knows and/or implicitly trusts the other user. As a result, a connection or communications pathway may be automatically created and/or configured between the client devices of the users to facilitate communications between the users based on the implicit trust.

The communications application may be an instant messaging application. The communications pathway may be implemented as a virtual private network.

In another general aspect, a communications pathway between a first client A device 102 associated with the first user and a second client A device 102 associated with the second user may be established upon determining that the first user is included on a user list associated with a communications application of the second user and that the second user is included on the user list associated with a communications application of the first user. The communications pathway may be a virtual private network.

To establish the communications pathway, an Internet protocol address of the first user may be provided to the second client device, and an Internet protocol address of the second user may be provided to the first client device. A shared secret also may be provided to the first and second client devices. The first client device may contact the Internet protocol address of the second client A device 102 and present the shared secret. The second client device may validate the identity of the first client B device 104 based on the presented shared secret.

In another general aspect, upon determining that an Internet protocol address (e.g., a global Internet protocol address of a firewall associated with the first client device) of a communication received from a first client device is different from the Internet protocol address (e.g., a local source Internet protocol address) of the first client device, a determination may be made that a direct communications pathway between the first client A device 102 and the second client device may not be established. In this case, to establish the communications pathway a hole may be opened in the firewall associated with the first client device for an Internet protocol address associated with the second client device.

To open the hole, a request for a proxy forward may be sent to the firewall. The firewall selects a target Internet protocol address and a port number. The target Internet protocol address is provided to a host (e.g., an instant messaging host) associated with the communications application. The host sends the target Internet protocol address to the second client device. The second client device responds to the host with an Internet protocol address associated with the second client device. The host provides the Internet protocol address associated with the second client device to the firewall associated with the first client device to enable the proxy forward for the Internet protocol address associated with the second client device.

The Internet protocol address associated with the second client device may be the Internet protocol address of a firewall associated with the second client device.

Other features will be apparent from the description, the drawings, and the claims.

DESCRIPTION OF DRAWINGS

Like reference symbols in the various drawings indicate like elements.

DETAILED DESCRIPTION

Some communications techniques include the use of a contact list or user list. Communications applications employing these techniques facilitate communications by allowing a user to select an intended recipient of a message from the user list. Although such applications provide a useful interface for transmitting messages, the user lists also may be helpful to facilitate other types of communications. For example, if two users include each other on their user lists, an implicit trust between the users may be inferred. Based on the implicit trust, a communications pathway may be established between the users to facilitate communications, as described in detail below.

Figure 1:
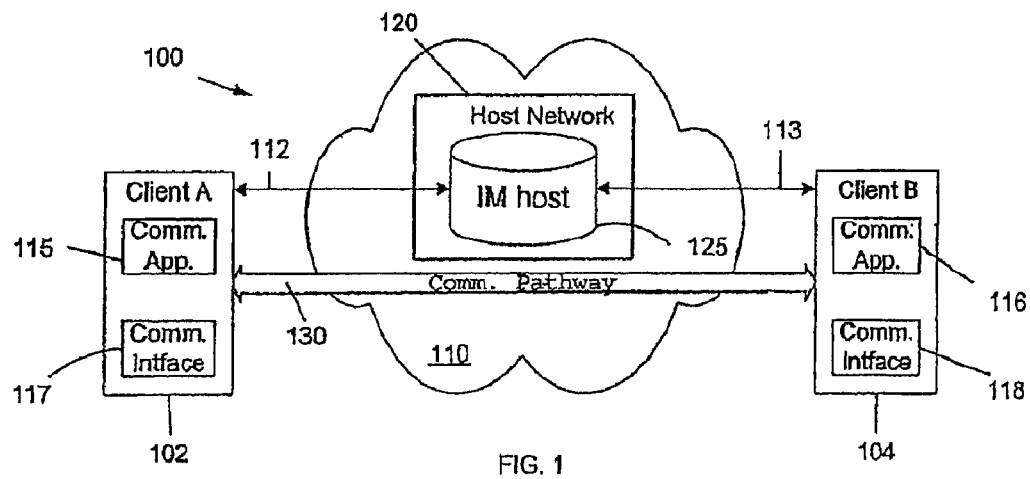
FIGS. 1-4 and 7 are block diagrams of an exemplary communications system including communications pathways.

Referring to FIG. 1, a communications system 100 includes a client A device 102 and a client B device 104 that are associated with users A and B. Client device 102 and 104 include communication applications 115 and 116 (e.g., IM applications). When client A device 102 connects to the external network 110, the communications application 115 may connect with the host network 120 connected to the external network 110 (e.g., by logging-on to the host network 120) using communications link 112. The client A device 102 also may connect to an IM host 125 that is part of the host network 120. Similarly, when client B device 104 connects to the external network 110, the communications application 116 may connect with the host network 120 and the IM host 125 using communications link 113. Once a client device 102 or 104 has connected to the IM host 120, the communications applications 115 and 116 may send and receive messages.

If user A sends a message to user B, the IM host 125 may determine that the user list of user B or a particular portion of the user list (e.g., a group, such as buddies, family, or garners) includes user A, and that the user list (or particular portion of the user list) of user A includes user B. Based on this determination, the IM host 125 may infer that there is an implicit trust between user A and user B or that user A and user B have granted access of their client devices to each other. The IM host 125 automatically creates a communications pathway between the client devices 102 and 104 by sending a message to each of client devices 102 and 104. Each message includes the IP address and port of the other client A device 102 and a shared secret.

Each client device may contact the other client device using the specified IP address and port. In addition, each client device may present the shared secret to the other client device to validate. The client devices 102 and 104 then enter negotiations to establish the details (e.g., a communications protocol and encryption) of the communications pathway 130.

The external network 110 may be implemented using one or more local area networks (LANs), wide area networks (WANs), global networks, or any combination of these networks (e.g., the World Wide Web or the Internet). These networks may include any number of components and/or devices (e.g., hubs, routers, switches, servers, repeaters, storage devices, communications interfaces, and various communications media) and various other supporting components (e.g., software, operators/administrators/technicians, and other infrastructure).

The client devices 102 and 104 may be operated by one or more users to access the external network 110 and any associated devices and/or components. An example of a client device is a general-purpose computer capable of responding to and executing instructions in a defined manner. Client devices also may include a special-purpose computer, a personal computer ("PC"), a workstation, a server, a laptop, a Web-enabled phone, a Web-enabled personal digital assistant ("PDA"), an interactive television set, a set top box, an on-board (i.e., vehicle-mounted) computer, or a combination of one or more these devices capable of responding to and executing instructions. The client device may include any number of other devices, components, and/or peripherals, such as memory/storage devices, input devices, output devices, user interfaces, and/or communications interfaces.

The client A device 102 also may include one or more software applications (e.g., an operating system, a browser application, a microbrowser application, a server application, a proxy application, a gateway application, a tunneling application, an e-mail application, an IM client application, an online service provider client application, and/or an interactive television client application) loaded on the client device to command and direct the client device. Applications include a computer program, a piece of code, an instruction, or some combination thereof, for independently or collectively instructing the client device to interact and operate as desired.

The applications may be embodied permanently or temporarily in any type of machine, device, component, physical or virtual equipment, storage medium, or propagated signal capable of providing instructions to the client device. In particular, the applications may be stored on a storage media or device (e.g., read only memory (ROM), a random access memory (RAM), a volatile/non-volatile memory, a magnetic disk, or a propagated signal or wave) readable by the client device, such that if the storage medium or device is read by the client device, the steps or instructions specified are performed.

Each of the client devices 102 and 104 also includes one or more a corresponding communications interface 117 or 118 that allow the client device to send information to and receive information from the corresponding communications links 112 or 113.

The communications links 112 and 113 may be configured to send and receive signals (e.g., electrical, electromagnetic, or optical) that convey or carry data streams representing various types of analog and/or digital content. For example, the communications links 112 and 113 may be implemented using various communications media and one or more networks comprising one or more network devices (e.g., servers, routers, switches, hubs, repeaters, and storage devices). The one or more networks may include WANs, LANs, a plain old telephone service (POTS) network, a digital subscriber line (DSL) network, an integrated services digital network (ISDN), and a synchronous optical network (SONNET), or a combination of one or more of these networks. In addition, the communications links 112 and 113 may include one or more wireless links that transmit and receive electromagnetic signals, such as, for example, radio, infrared, and microwave signals, to convey information.

Communications applications, such as communications applications 115 and 116, loaded and/or running on a client device may command and direct communications by the client device. The communications applications may work in conjunction with or enable the corresponding communications interface 117 or 118 to exchange data with other devices, networks, and communications media. Examples of communications applications include a browser application, a microbrowser application, a server application, a proxy application, a gateway application, a tunneling application, an e-mail application, an instant messaging (IM) application, an interactive television application, and/or an Internet service provider (ISP) application.

As described above, one example of a communications application is the IM application. The IM application may provide an IM user interface that allows a user to send and receive messages. The IM user interface may include an IM message display area including one or more windows/frames to enter and present messages. The IM user interface also may include icons, menus, and/or other inputs to control the interface, configure interface settings, and activate features of the interface.

One feature of an IM application is a list of users or contacts, such as, for example, the Buddy List for AOL's Instant Messenger. The user list may be populated with identifiers (e.g., screen names) of one or more users. The user identifiers that populate the user list may be divided into one or more categories of users (e.g., friends, family, coworkers, buddies, and garners).

The user list also provides an indication of whether a user associated with an identifier is currently able to receive messages (e.g., is currently connected to the external network 110 and able to engage in a one-to-one and/or peer-to-peer communication with another client device). A user may send a message to another user by manually entering a user identifier or selecting a user identifier from the list.

When the IM application is activated and the client device is connected to the external network 110, the IM application causes the client device to contact the host network 120, which is connected to the external network 110. The host network 120 may include one or more login servers (not shown) to enable communications with and to authorize access by a client A device 102 and other networks to various elements of the host network 120 and/or the IM host 125. The IM host 125 may include one or more IM servers and storage devices that manage and enable IM communications provided by the host network 120.

To access the IM host 125 and begin an IM session, the client device 102 or 104 establishes a connection to the login server. The login server determines whether a particular user is authorized to access the IM host 125 by verifying a user identifier and/or a password. If the user is authorized to access the IM host 125, the login server identifies a particular IM server (not shown) for use during the user's session. The client device establishes a connection to the IM host 125 and the designated server through the corresponding communications link 112 or 113.

Once a connection to the IM server has been established, the client device may directly or indirectly transmit data to and access content from the IM server. By accessing the IM server, a user may use the IM application to view whether or not particular users are online, exchange instant messages with users, participate in group chat rooms, trade files, such as pictures, invitations, or documents, find other users with similar interests, get customized news and stock quotes, and search the World Wide Web.

The IM host 125 also may include a user profile server (not shown) connected to a database that may store user profile data. The user profile server may be used to enter, retrieve, edit, manipulate, or otherwise process user profile data. In one implementation, a user's profile data includes, for example, a user list, identified interests, a geographic location, an Internet protocol address associated with the client device, a general account, and demographic information. The user may enter, edit and/or delete profile data using an installed IM application on the client device.

Because the user data profile may be accessed by the IM host 125, the user does not have to reenter or update such information in the event that the user accesses the IM host 125 using a new or different client device. Accordingly, when a user accesses the IM host 125, the IM server can instruct the user profile server to retrieve the user's profile data from the database and to provide, for example, the user list to the IM server. The user profile server also may communicate with other servers in the host network 120 to share user profile data. The user profile data also may be saved locally on a client device. In this implementation, the client device may provide the user profile or user profile data to the host network 120 at specified times or when requested. In another implementation, the user profile may be stored locally at the client A device 102 and at the host network 120 and may be periodically synchronized (e.g., at login).

One communications pathway 130 that may be established between the client devices is a virtual private network (VPN). A VPN, also known as an encrypted tunnel, allows two physically separated networks or client devices to be connected over a WAN, such as the Internet, without exposing transmitted data to viewing by unauthorized parties. VPNs require at least two cooperating devices. The communication path between these devices may be viewed as a secure tunnel through the insecure external network 110. Wrapped around the tunnel is a series of functions, which may include authentication, access control, and data encryption, that protect the transmitted data from being viewed or used by others. The VPN may be established by the IM application or other communication application working in conjunction with the communications interface 117 or 118 and/or other devices (e.g., a firewall).

In one implementation, a communications pathway 130 maybe established as follows. When a first user sends an instant message to second user, the IM host 125 receives the message, and, if the second user is connected to the host network 120, sends the message to the second user. In addition, the IM host may determine whether each user is listed in the user list of the other user (e.g., by contacting the profile server or by querying the client devices). If each user is listed in the user list of the other user, the IM host 125 may determine that permission has been granted implicitly by each user to give the other user access to their client device.

The IM host 125 may then send a message to each client device including the IP address and port of the other client A device 102 and a shared secret. The shared secret may include information (e.g., an identification, a key, or a certificate) that enables a client device to prove and/or authenticate the identity of a user. In another implementation, the shared secret may be provided to each client B device 104y a third party host (e.g., an Internet certificate site, such as Verisign) that facilitates communications.

Using the information in the message from the IM host 125, each client device may attempt to establish a communications pathway 130. For example, each device may contact the other client A device 102 the IP address and port specified in the message. After establishing contact with the other client device, the shared secret is presented to prove the identity of the contacting client device. Once the shared secret is verified by the other client device, the client devices may enter negotiations to establish the details of the communications pathway 130 (e.g., a communications protocol and encryption). If two communications pathways are established, one may be dropped during the negotiations.

Once the communications pathway 130 is established, the client devices may exchange data using the communications pathway 130. Both client devices are provided with, in effect, a virtual network communication card that is able to exchange information directly with the other client device. This process is transparent to the users of the client devices.

In another implementation, a client device may send a request to the IM host 125 to establish a connection with another client device. In this case, the IM host 125 responds to the request by determining whether the implicit access has been granted between the requesting client A device 102 and the target client device. If so, the requesting client device is provided with the IP address and port of the target device and a shared secret. The target device also is provided with the shared secret. Establishing of the communications pathway 130 may then proceed as described above.

Either or both client devices may attempt to establish a communications pathway 130. If both client devices attempt to establish the communications pathway 130, only one of the attempts needs to be successful. However, if more than one communications pathway 130 is established, one of the two pathways may be dropped as part of the negotiations. Once the communications pathway 130 is established, client devices 102 and 104 may exchange data using the pathway 130.

Figure 2:
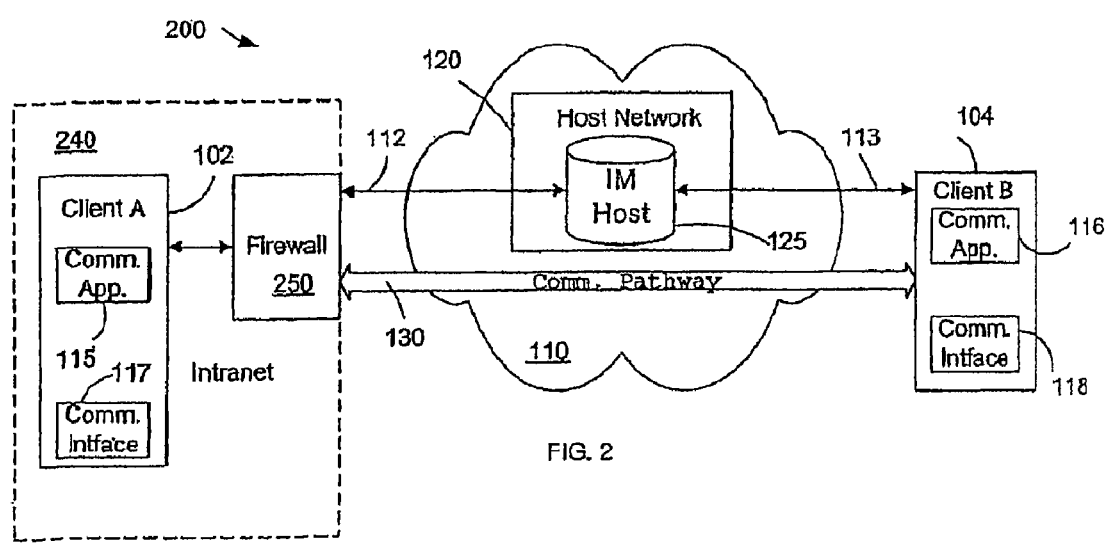

As shown in FIG. 2, a communications system 200 includes client A device 102 connected to an intranet 240 or other system configuration that includes a firewall 250 (or other device, such as a server performing filtering or network address translation). The firewall 250 may enforce an access control policy between the intranet 240 and the external network 110, and provides at least two basic mechanisms: one to block traffic and the other to permit traffic. The firewall 250 maybe implemented by one or more applications running on the client device (e.g., a personal firewall) or one or more separate devices, such as, for example, a router. The firewall 250 may provide one or more functions, such as packet filtering, network address translation (NAT), and proxy services. In addition, the firewall may provide encrypted authentication and virtual private networking, in addition to other features (e.g., content filtering and virus scanning).

If either client device 102 or 104 sends a message to the IM host 125, the IM host 125 determines whether the user associated with each client device is included in the user list of the other user. If each user is included in the list of the other user, the IM host 125 may provide the IP address/port of each client A device 102 and a shared secret to the other device. Each client device 102 and 104 may attempt to establish contact with the other client device.

However, as shown in FIG. 2, client B device 104 is not able to establish contact with client A device 102 because the IP address provided by the IM host 125 does not result in a connection. For example, if the IM host 125 provides the IP address and port number of client A device 102, an error is generated because the IP address is a local IP address of the intranet 240 (and not understood by devices outside of the intranet 240. If the IP address/port of the firewall 250 is provided, the firewall 250 blocks any connection attempted by client B device 104 because the firewall 250 expects a message from the IP address of the IM host 125 (which is different than that of client B device 104).

Notwithstanding the difficulties that may be encountered establishing a connection due to the firewall associated with client A device 102, the communications pathway 130 from client A device 102 to client B device 104 may established. For instance, client A device 102 may contact client B device 104 at the specified IP address/port and present the shared secret to client B device 104 to prove the identity of client A device 102, which client B device 104 verifies. Then, the client devices 102 and 104 may enter negotiations to establish the details of the communications pathway 130.

In another implementation of the communications system 200, when an instant message is sent to either client device, the IM host 125 may determine that the IP address and port associated with client A device 102 does not match the actual IP address being used to establish communications (e.g., because firewall 250 substitutes the local IP address with a global IP address of the firewall 250). From this information, the IM host 125 may be configured to deduce that the client A device 102 is behind a firewall (or similar device). Through a similar process, the IM host 125 may determine that the client B device 104 is not behind a firewall. In this case, if an attempt is made to establish a communications pathway 130 by either client device, the IM host 125 may send a message to the client A device 102 that provides the IP address and port of the client B device 104 and a shared secret, and also may send the shared secret to client B device 104 to facilitate communications. Client A device 102 then proceeds to contact client B device 104 and establish a communications pathway 130 as described above.

Figure 3:
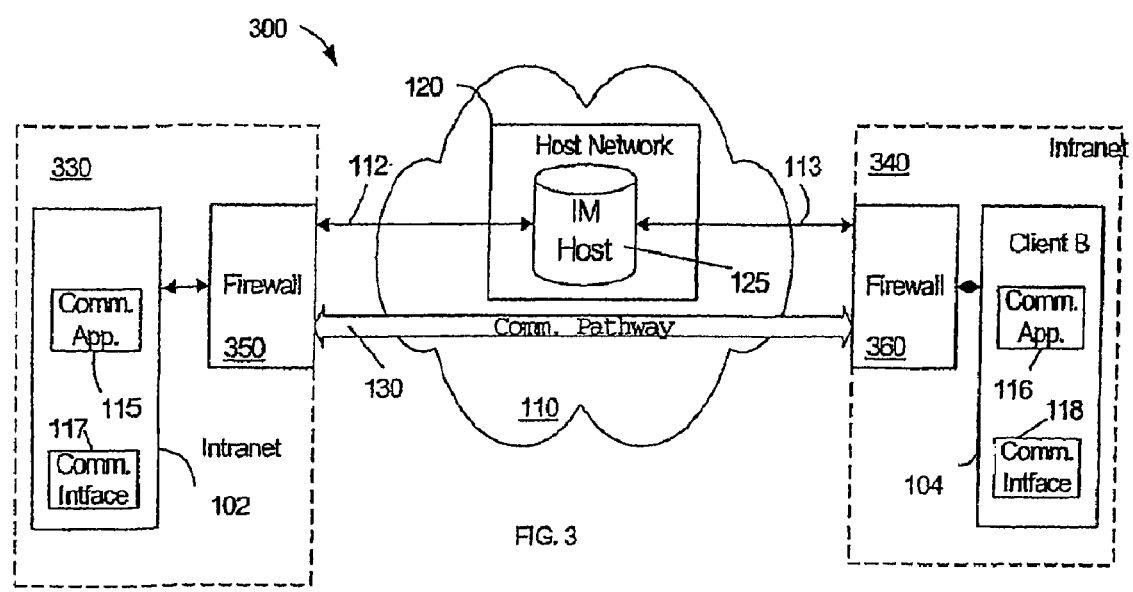

As shown in FIG. 3, a communications system 300 includes client devices 102 and 104 that are both connected to respective intranets 330 and 340, or otherwise behind firewalls (or other NAT devices). Client A device 102 connects to firewall 350 to access the external network 110 using communications link 112. Similarly, client B device 104 connects to firewall 360 to access the external network 110. Although firewalls 350 and 360 are shown as separate elements of the intranets 330 and 340, the firewalls also maybe implemented by client devices 102 and 104.

If a message is sent by user A to user B, the IM host 125 may determine that user A is listed on the user list of user B (or a group of the list of user B), and that user B is listed on the user list of user A (or a group of the list user A). Based on this determination, the IM host 125 may infer that user A and user B have implicitly granted access to each other. If the IM host 125 attempts to give the local IP address or the global IP address of the associated firewall of either client A device 102 or 104 to the other, a communications pathway 130 may not result for the reasons explained above with regard to FIG. 2. However, this implementation may provide a connection as follows.

First, the IM host 125 may determine that a direct connection cannot be made by the client devices. For example, the IM host 125 may determine that the global IP addresses used to establish communications with the IM host 125 do not match the local IP addresses purported to be used by the IM applications of the client devices. The IM host 125 also may determine that direct connection may not be made as a default because all other attempts to establish a communications pathway fail. In either case, the IM host 125 may inform one client device (e.g., client A device 102) that a direct connection may not be established, whether or not it is physically impossible to achieve such a connection.

In this instance, the communications application 115 of client A device 102 may contact the firewall 350 and request that the firewall 350 open a hole. For example, the communications application 115 may request that the firewall 350 create a proxy forward to pass traffic from client B device 104 to client A device 102. The firewall 350 randomly selects a port number and replies to the communication application 115 of client A device 102 with the selected port number and the public IP address of the firewall 350. The selected IP address/port data effectively designate a hole in firewall 350 that may be opened to allow direct communications with client A device 102.

The communications application 115 may provide the selected IP address/port data to the IM host 125. The IM host 125 sends the selected IP address/port data to the communications application 116 of client B device 104 along with a shared secret. The IM host 125 also provides the IP address of firewall 360 to the communications application 115 of client A device 102 along with the shared secret. The communications application 115 passes the IP address of firewall 360 to firewall 350. Firewall 350 opens the hole only for firewall 360 using the IP address of firewall 360.

The communications application 116 of client B device 104 connects to the specified IP address and port of firewall 350 (through firewall 360). As a result, the traffic from the communications application 116 arriving at the firewall 350 appears to originate from firewall 360, and the traffic is proxied forward to the communications application 115 of client A device 102. The communications application 115 may verify the identity of client B device 104 using the shared secret. Communications applications 115 and 116 may negotiate the details of the communications pathway 130 (e.g., a VPN) and establish the communications pathway 130.

Figure 4:
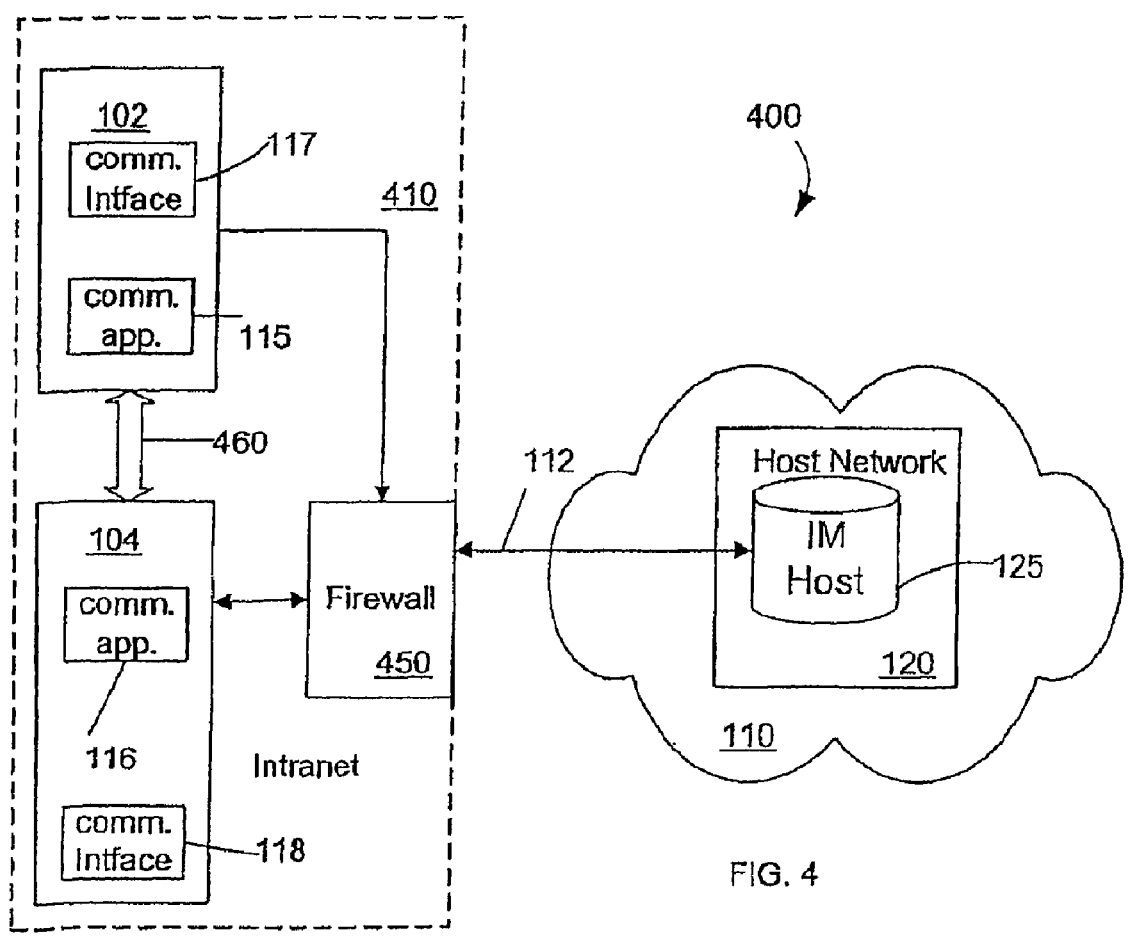

FIG. 4 shows a communications system 400 that includes an intranet 410 in which both client A device 102 and client B device 104 are located behind a firewall 450. However, even though the client devices 102 and 104 are behind the firewall 450, the local IP address and port of each client device allow direct communications between the client devices to be established because the local IP address information is recognized by devices within the intranet 410. In this case, a communications pathway 460 may be directly established by the client devices using the infrastructure of the intranet 410 in a manner as described with regard to FIG. 1 above.

The IM user interface may include a feature or setting to allow a user to block one or more users, a group of users, or all users on the user list from establishing a communications pathway. In addition, the IM user interface may include a setting to disable or prohibit the IM application from establishing any communications pathway regardless of whether each of two users includes the other user on their user lists. The IM user interface also may be configured to allow the communication pathway to be established for a specified group of users on the list (e.g., a user category, such as buddies, family, coworkers, and/or gamers).

Figure 5:
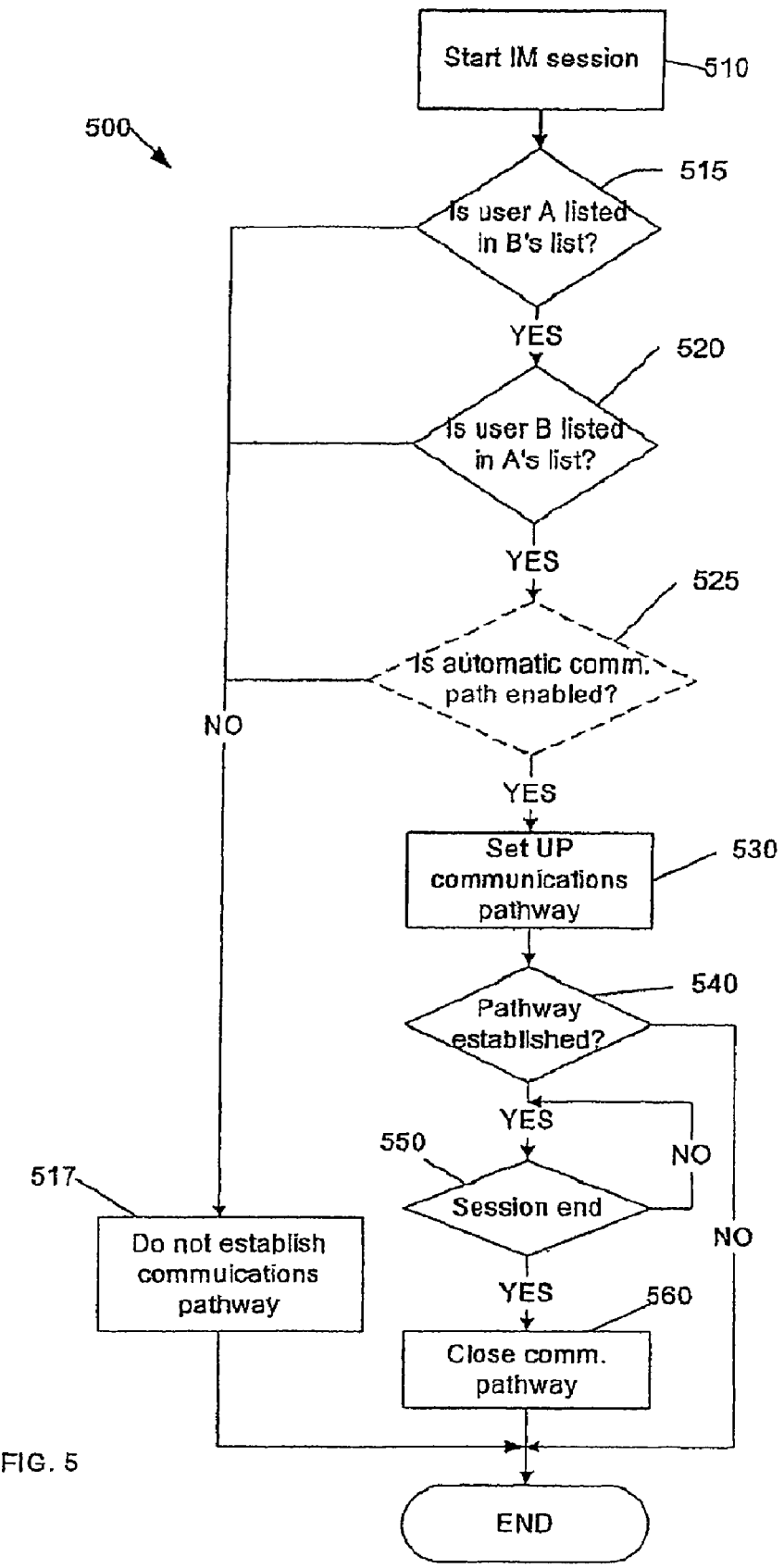
FIGS. 5 and 6 are flow charts of an exemplary process used to establish implicit communications.

FIG. 5 shows an exemplary process 500 to establish a communications pathway (e.g., a VPN). Initially, a user A starts an IM session (510). A determination is made as to whether user A is included in the list of user B (515). If not, a VPN is not established (517).

If user A is in the list of user B, a determination is made as to whether user B is in the list of user A (520). If not, a VPN is not established (517).

Optionally, a determination may be made whether automatic VPN connections are enabled (525). If not, a VPN is not established (517).

If user B is in the list of user A and the automatic VPN connections are enabled, then an attempt to establish a VPN (530) is made as described below with respect to FIG. 6. If the VPN is established (540), the VPN is maintained until the IM session is over, either client device requests that the VPN be closed, or either client device disconnects from the external network (550). Once the IM session is finished, the VPN is closed (560).

Figure 6:
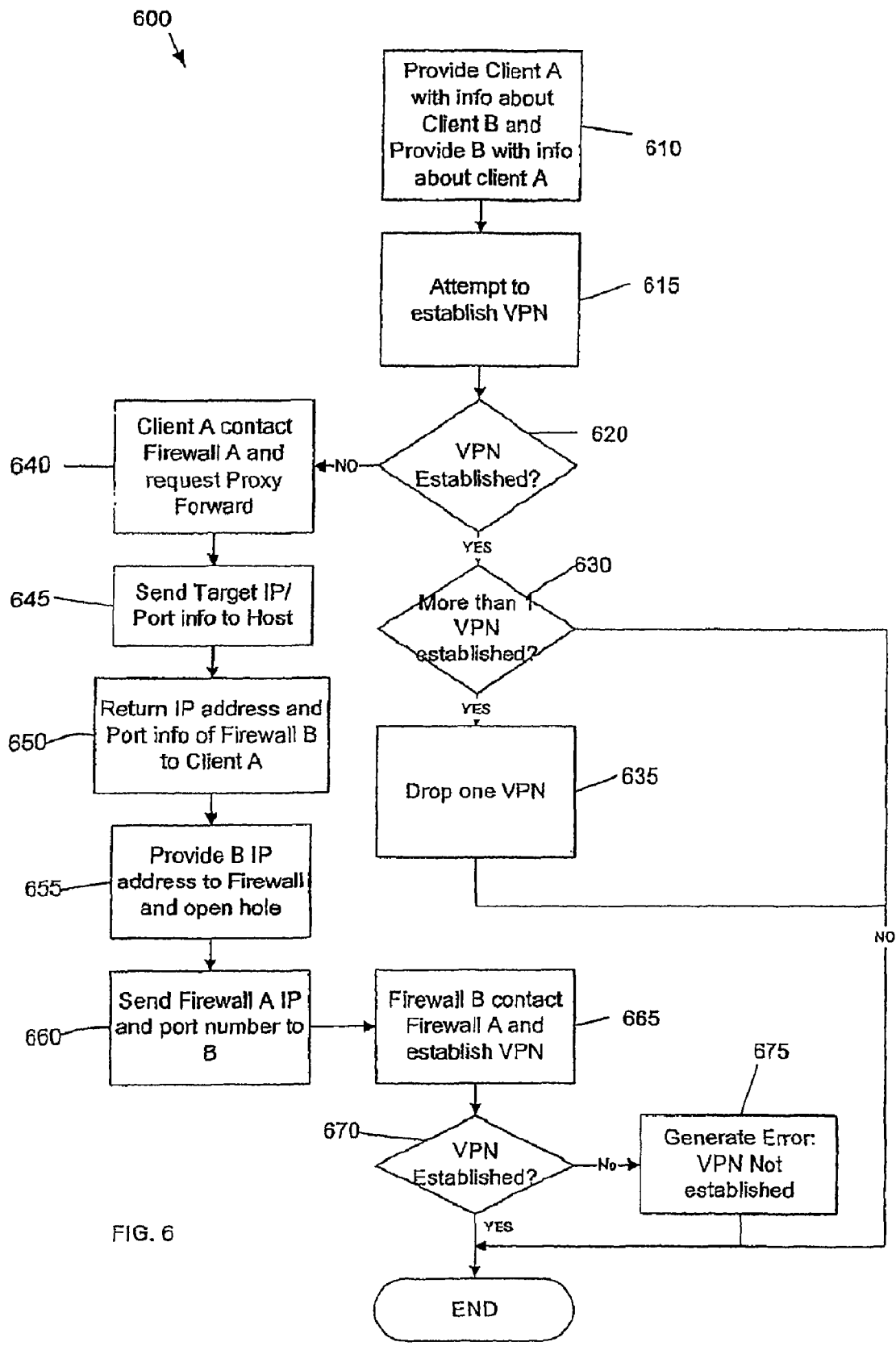

FIG. 6 shows an exemplary a process 600 for setting up or establishing a communications pathway, such as a VPN. First, the IM host provides information about each client device (e.g., the client's IP address, port, and a shared secret that may be used to authenticate user/client identity) to the client devices (610). After receiving the information, each client may attempt to establish a VPN using the information (615), for example, by contacting the IP address/port provided and offering the shared secret for validation/authentication. If either client device is able to contact the other client device using the information, the VPN may be established as negotiated between the client devices.

Upon determining that a VPN was established (620), a determination is made as to whether more than one VPN was established (e.g., both clients were able to contact each other with the information provided and therefore established two VPNs) (630). If more than one VPN was established between the clients, one of the two VPNs is dropped during the negotiations (635).

Upon determining that a VPN was not established (620), one of the client devices (e.g., client A device 102) may contact its firewall to request a proxy forward be created for the other client device (e.g., client B device 104) (640). The client A device 102 receives a target public IP address and random port number selected by its associated firewall. Client device A sends the target IP/Port information to a host (645). The host returns the public IP address of the firewall of client B device 104 (650). Client device A provides the IP address to its firewall, which opens a hole in the firewall for the firewall of client B (655). The host sends the target IP/port information to the firewall of client B (660). The firewall of client B contacts firewall of client A to establish a VPN (665). If a VPN is not established (670), an error message is generated (675) (e.g., automatic VPN could not be configured).

Figure 7:
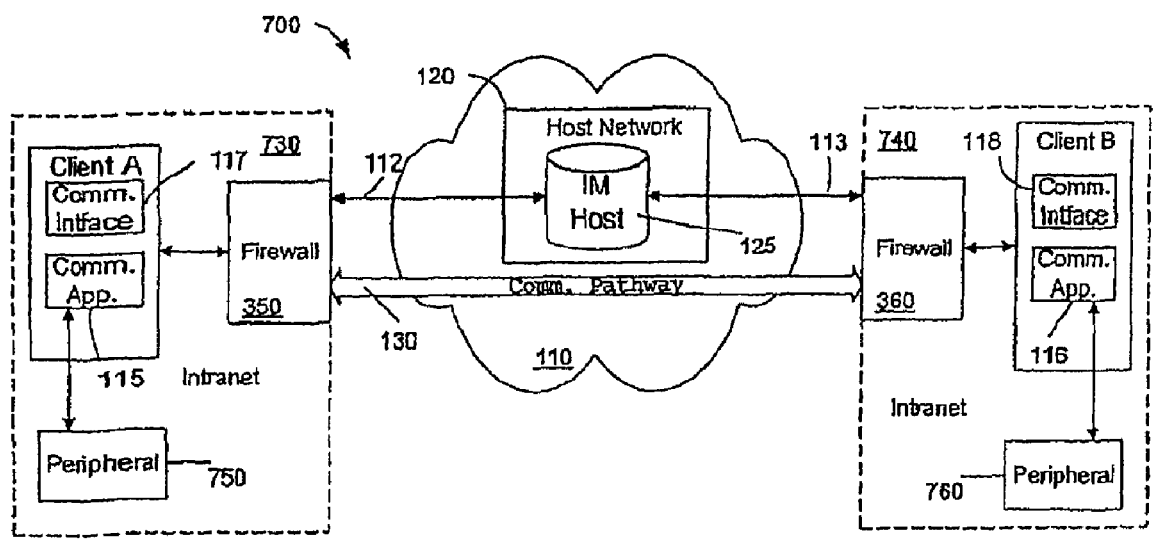

As shown in FIG. 7, a communications system 700 includes client devices 102 and 104 connected to an external network 110. In addition, peripheral devices 750 and 760 (e.g., a gaming device, such as an X-Box™ or Playstation™) are connected to each client device 110. The peripheral devices 750 and 760 may employ an exploring application to determine whether they are connected to any other peripheral devices. If another gaming device is detected, the gaming devices 750 and 760 may establish a connection using a data exchange protocol.

In the implementation shown in FIG. 7, the local communications applications 115 and 116 on the client devices 102 and 104 may be programmed to mimic the data exchange protocol of the peripheral devices (e.g., to appear as peripheral devices). Client devices 102 and 104 (using the communications application on each client device) may automatically establish a communications pathway (e.g., VPN) as described above. As a result, the peripheral devices 750 and 760 may exchange data (e.g., game data that is used to play a multiplayer/device game) with the communications applications as if the communications application were another peripheral device. The communications application 115 may pass the data to the other communications application 116 using the communications pathway 130. The other communications application 116 passes the data to its connected peripheral device 760. As a result, an automatic (or configurable) communications link may be established between the peripheral devices (e.g., to play a game). To the peripheral devices 750 and 760, it appears as if each device is communicating with another local peripheral device.

A number of exemplary implementations have been described. Nevertheless, it is understood that various modifications may be made. For example, suitable results may be achieved if the steps of the disclosed techniques are performed in a different order and/or if components in a disclosed architecture, device, or circuit are combined in a different manner and/or replaced or supplemented by other components. Accordingly, other implementations are within the scope of the following claims.

What is claimed is:

1. A method comprising:
logging a first client device into a server;
logging a second client device into the server;
accessing, using the server, a first user list associated with a first user of the first client device;
accessing, using the server, a second user list associated with a second user of the second client device, wherein the first user list and the second user list are maintained separately from one another;
analyzing, using the server, the accessed first user list to determine whether an identifier of the second user is included in the first user list;
analyzing, using the server, the accessed second user list to determine whether an identifier of the first user is included in the second user list;
regulating, using the server, a communications pathway between the first client device and the second client device based on both the determination of whether the identifier of the first user is included on the second user list and the determination of whether the identifier of the second user is included on the first user list.

2. The method of claim 1 wherein regulating the communications pathway includes establishing a virtual private network.

3. The method of claim 1 wherein regulating the communications pathway includes establishing a peer-to-peer connection between the first client device and the second client device.

4. The method of claim 1 wherein the first user list and the second user list comprise lists of identities for whom online presence is monitored.

5. The method of claim 1 further comprising receiving, at the server, a request from a first communications program executing on the first client device to establish a communications pathway with a second communications program executing on the second client device, wherein:
    analyzing, using the server, the accessed first user list to determine whether the identifier of the second user is included in the first user list comprises analyzing, using the server, the accessed first user list to determine whether the identifier of the second user is included in the first user list in response to receiving the request;
    analyzing, using the server, the accessed second user list to determine whether the identifier of the first user is included in the second user list comprises analyzing, using the server, the accessed second user list to determine whether the identifier of the first user is included in the second user list in response to receiving the request; and
    regulating the communications pathway comprises establishing the communications pathway between the first communications program and the second communications program.

6. The method of claim 1 further comprising receiving a message from a first communications application executing on the first client device directed to a second communications application executing on the second client device, wherein:
    analyzing, using the server, the accessed first user list to determine whether the identifier of the second user is included in the first user list comprises analyzing, using the server, the accessed first user list to determine whether the identifier of the second user is included in the first user list in response to receiving the message;
    analyzing, using the server, the accessed second user list to determine whether the identifier of the first user is included in the second user list comprises analyzing, using the server, the accessed second user list to determine whether the identifier of the first user is included in the second user list in response to receiving the message; and
    regulating the communications pathway comprises establishing the communications pathway between the first communications program and the second communications program.

7. The method of claim 1, wherein regulating, using the server, a communications pathway between the first client device and the second client device, comprises automatically establishing a communications pathway between the first client device and the second client device.

8. The method of claim 1, wherein regulating, using the server, a communications pathway between the first client device and the second client device, comprises sending a shared secret to the first client device and the second device, which enables the first client device and the second client device to authenticate themselves.

9. A system comprising:
    a first client device;
    a second client device; and
    a server configured to:
    access a first user list associated with a first user of the first client device;
    access a second user list associated with a second user of the second client device, wherein the first user list and the second user list are maintained separately from one another;
    analyze the accessed first user list to determine whether an identifier of the second user is included in the first user list;
    analyze the accessed second user list to determine whether an identifier of the first user is included in the second user list; and
    regulate a communications pathway between the first client device and the second client device based on both the determination of whether the identifier of the first user is included on the second user list and the determination of whether the identifier of the second user is included on the first user list.

10. The system of claim 9 wherein, to regulate the communications pathway, the server is configured to establish a virtual private network.

11. The system of claim 9 wherein, to regulate the communications pathway, the server is configured to establish a peer-to-peer connection between the first client device and the second client device.

12. The system of claim 9 wherein the first user list and the second user list comprise lists of identities for whom online presence is monitored.

13. The system of claim 9 wherein:
    the server is configured to receive a request from a first communications program executing on the first client device to establish a communications pathway with a second communications program executing on the second client device;
    to analyze the accessed first user list to determine whether the identifier of the second user is included in the first user list, the server is configured to analyze the accessed first user list to determine whether the identifier of the second user is included in the first user list in response to receiving the request;
    to analyze the accessed second user list to determine whether the identifier of the first user is included in the second user list the server is configured to analyze the accessed second user list to determine whether the identifier of the first user is included in the second user list in response to receiving the request; and
    to regulate the communications pathway, the server is configured to establish the communications pathway between the first communications program and the second communications program.

14. The system of claim 9 wherein:
    the server is configured to receive a message from a first communications application executing on the first client device directed to a second communications application executing on the second client device;
    to analyze the accessed first user list to determine whether the identifier of the second user is included in the first user list, the server is configured to analyze the accessed first user list to determine whether the identifier of the second user is included in the first user list in response to receiving the message;
    to analyze the accessed second user list to determine whether the identifier of the first user is included in the second user list, the server is configured to analyze the accessed second user list to determine whether the identifier of the first user is included in the second user list in response to receiving the message; and
    to regulate the communications pathway, the server is configured to establish the communications pathway between the first communications program and the second communications program.

15. The system of claim 9, wherein the server is further configured to automatically establish a communications pathway between the first client device and the second client device.

16. The system of claim 9, wherein the server is further configured to send a shared secret to the first client device and the second device, which enables the first client device and the second client device to authenticate themselves.

17. A host system comprising:
an interface to receive a communication from a first client device associated with a first user and to transmit a communication to a second client device associated with a second user;
storage to store a first user list associated with the first user and to store a second user list associated with the second user; and
a host configured to:
determine an identifier of the first user and an identifier of the second user;
access the first user list associated with the first user of the first client device;
access the second user list associated with the second user of the second client device, wherein the first user list and the second user list are maintained separately from one another;
analyze the accessed first user list to determine whether an identifier of the second user is included in the first user list;
analyze the accessed second user list to determine whether an identifier of the first user is included in the second user list; and
regulate a communications pathway between the first client device and the second client device based on both the determination of whether the identifier of the first user is included on the second user list and the determination of whether the identifier of the second user is included on the first user list.

18. The system of claim 17 wherein, to regulate the communications pathway, the host is configured to establish a virtual private network.

19. The system of claim 17 wherein, to regulate the communications pathway, the host is configured to establish a peer-to-peer connection between the first client device and the second client device.

20. The system of claim 17 wherein the first user list and the second user list comprise lists of identities for whom online presence is monitored.

21. The system of claim 17 wherein:
the communication from the first client device is a request received from a first communications program executing on the first client device to establish a communications pathway with a second communications program executing on the second client device;
to analyze the accessed first user list to determine whether the identifier of the second user is included in the first user list, the host is configured to analyze the accessed first user list to determine whether the identifier of the second user is included in the first user list in response to receiving the request;
to analyze the accessed second user list to determine whether the identifier of the first user is included in the second user list, the host is configured to analyze the accessed second user list to determine whether the identifier of the first user is included in the second user list in response to receiving the request; and
to regulate the communications pathway, the host is configured to establish the communications pathway between the first communications program and the second communications program.

22. The system of claim 17 wherein:
the communication from the first client device is a message from a first communications application executing on the first client device directed to a second communications application executing on the second client device;
to analyze the accessed first user list to determine whether the identifier of the second user is included in the first user list, the host is configured to analyze the accessed first user list to determine whether the identifier of the second user is included in the first user list in response to receiving the message;
to analyze the accessed second user list to determine whether the identifier of the first user is included in the second user list the host is configured to analyze the accessed second user list to determine whether the identifier of the first user is included in the second user list in response to receiving the message; and
to regulate the communications pathway, the host is configured to establish the communications pathway between the first communications program and the second communications program.

23. The system of claim 17, wherein the host is further configured to automatically establish a communications pathway between the first client device and the second client device.

24. The system of claim 17, wherein the host is further configured to send a shared secret to the first client device and the second device, which enables the first client device and the second client device to authenticate themselves.

* * * * *